(12) United States Patent
Piantanida et al.

(10) Patent No.: US 8,784,717 B2
(45) Date of Patent: Jul. 22, 2014

(54) PROCESS AND APPARATUS FOR MOULDING AND CURING TYRES

(75) Inventors: Pier Giuseppe Piantanida, Milan (IT); Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 523 days.

(21) Appl. No.: 13/057,126

(22) PCT Filed: Aug. 4, 2008

(86) PCT No.: PCT/IT2008/000535
§ 371 (c)(1),
(2), (4) Date: Feb. 1, 2011

(87) PCT Pub. No.: WO2010/016073
PCT Pub. Date: Feb. 11, 2010

(65) Prior Publication Data
US 2011/0133363 A1    Jun. 9, 2011

(51) Int. Cl.
*B29C 35/00*    (2006.01)
(52) U.S. Cl.
USPC ............. 264/315; 264/326; 264/502; 425/36; 425/46; 425/43; 425/48
(58) Field of Classification Search
USPC .......... 425/36, 46, 43, 48; 264/315, 326, 502
See application file for complete search history.

(56) References Cited

U.S. PATENT DOCUMENTS 2,997,740 A    8/1961 Soderquist
3,471,895 A  * 10/1969 Stoyanov et al. ............... 425/36

(Continued)

FOREIGN PATENT DOCUMENTS

EP    0 368 546 A1    5/1990
EP    0 976 532 A1    2/2000

(Continued)

OTHER PUBLICATIONS

International Search Report from the European Patent Office for International Application No. PCT/IT2008/000535 (Mail date Apr. 22, 2009).

(Continued)

*Primary Examiner* — Joseph S Del Sole
*Assistant Examiner* — David N Brown, II
(74) *Attorney, Agent, or Firm* — Finnegan, Henderson, Farabow, Garrett & Dunner, L.L.P.

(57) ABSTRACT

A process for molding and curing tires, includes introducing a green tire into a curing mold, the mold including a first sidewall plate and a second sidewall plate, a ring of circumferential sectors circumscribing a mold cavity, an expandable bladder delimited by a membrane, and at least one bead molding ring which is movable between a first contracted operating position and a second extended operating position; and molding and curing the green tire in the curing mold; and between introducing the green tire and molding and curing it, the process includes extending the at least one bead molding ring from the first contracted operating position to the second extended operating position; forming a circumferential bearing surface which bears against a first axially inner surface portion of a first annular fixing structure of the green tire; pressing a second axially inner surface portion of the first annular fixing structure by expanding the membrane at a pre-molding pressure which is lower than a molding pressure, so as to bring the first annular fixing structure into contact with the first sidewall plate thus shaping an axially outer surface portion of the first annular fixing structure by means of the first sidewall plate and shaping the first axially inner surface portion of the first annular fixing structure by means of the circumferential surface of the at least one bead molding ring.

21 Claims, 8 Drawing Sheets (56) References Cited

U.S. PATENT DOCUMENTS

| | | | |
|---|---|---|---|
| 4,758,401 A | 7/1988 | Rach et al. | |
| 4,865,532 A | 9/1989 | Frerichs et al. | |
| 4,874,303 A * | 10/1989 | Ichikawa et al. | 425/28.1 |
| 5,127,811 A | 7/1992 | Trethowan | |
| 6,238,193 B1 | 5/2001 | Bosseaux | |
| 2003/0141627 A1 | 7/2003 | Girard et al. | |
| 2008/0128947 A1 * | 6/2008 | Sakamoto | 264/326 |
| 2009/0174122 A1 | 7/2009 | Mancini | |
| 2009/0211695 A1 | 8/2009 | Marchini et al. | |

FOREIGN PATENT DOCUMENTS

| | | |
|---|---|---|
| WO | WO-00/35666 | 6/2000 |
| WO | WO-2007/063560 A1 | 6/2007 |
| WO | WO-2008/007400 A1 | 1/2008 |
| WO | WO-2010/015910 A2 | 2/2010 |

OTHER PUBLICATIONS

International Preliminary Report on Patentability for International Application No. PCT/IT2008/000535 issued Feb. 8, 2011.

* cited by examiner

PROCESS AND APPARATUS FOR MOULDING AND CURING TYRES

CROSS REFERENCE TO RELATED APPLICATION

This application is a national phase application based on PCT/IT2008/000535, filed Aug. 4, 2008, the content of which is incorporated herein by reference.

BACKGROUND OF THE INVENTION

1. Field of the Invention

The present invention relates to a process and apparatus for moulding and curing tyres for vehicle wheels.

2. Description of the Related Art

In the production cycle of a tyre, following a tyre forming process in which the various components of the tyre are made and/or assembled, a moulding and curing process is carried out for the purpose of defining the structure of the tyre according to a desired geometry, normally including a specific tread pattern.

For this purpose, the green tyre (in the present text, this term denotes a tyre which has not yet been moulded and cured) is enclosed in a mould cavity which is formed inside a curing mould and which is shaped according to the geometric configuration of the outer surfaces of the tyre to be produced.

When the curing is complete, the mould is opened for the removal of the tyre.

A tyre generally comprises a carcass structure, in the shape of a toroidal ring, including one or more carcass plies, reinforced with reinforcing cords lying in radial planes (in the case of what are known as radial tyres), in other words in planes containing the axis of rotation of the tyre. The ends of each carcass ply are fixed to at least one metal annular structure, usually known as the bead core, which reinforces the beads, in other words the radially inner extremities of said tyre, which serve to fit the tyre on a corresponding mounting rim. A strip of elastomeric material, called the tread band, is placed on the crown of said carcass structure, and a relief pattern for ground contact is formed in this tread band at the end of the curing and moulding steps. A reinforcing structure, usually known as the belt structure, is placed between the carcass structure and the tread band. In the case of a car, this belt structure usually comprises at least two radially superimposed strips of rubberized fabric provided with reinforcing cords, usually metallic, positioned parallel to each other in each strip and crossing the cords of the adjacent strip, the cords being preferably positioned symmetrically about the equatorial plane of the tyre. Preferably, said belt structure also comprises a third layer of fabric or metal cords placed circumferentially (at 0 degrees), in a radially outer position, at least on the ends of the underlying strips.

Sidewalls of elastomeric material are also applied to the corresponding lateral surfaces of the carcass structure, each extending from one of the lateral edges of the tread band to the position of the corresponding annular structure for fixing to the beads.

The term "elementary components" in the present description and in the subsequent claims denotes elementary finished intermediate products in the form of a continuous elongate element of elastomeric material, which may comprise at least one textile or metal reinforcing cord, which may be cut to size.

Among the known procedures for forming tyres having the structure described above, some procedures have recently been developed in which the green tyres are produced from a limited number of elementary components supplied to a forming support. This procedure of forming from elementary components is an alternative to the conventional method of forming from finished intermediate products, which requires the separate production and storage of the various tyre components, such as the carcass plies, the bead cores, the belt strips, the tread band, and the sidewalls, to mention only a few, and it is preferable to the conventional method when tyres are to be produced in small batches or in specific sectors, for example, and/or in applications such as building high-performance or competition tyres. In the latter cases, this preference is based, in particular, on the greater uniformity, due to the lack of joints between the finished intermediate products.

For example, WO 00/35666 in the name of the present applicant describes a method and apparatus for forming a tyre by making its components directly on a toroidal support, in which some components are produced by feeding a continuous elongate element by means of an extruder, the element being conveniently distributed on the toroidal support while the support is rotated about its own axis.

U.S. patent application No. US 2003/0141627, published in the name of the Goodyear Tire & Rubber Company, describes a method and apparatus for moulding tyres with a radially extendable moulding ring for the beads. When extended, the bead moulding ring has a radial circumferential surface facing outwards for moulding the beads. The bead moulding rings each comprise a plurality of segments, half of which are first segments which are complementary to second segments and alternate circumferentially with the latter.

European patent application EP 0368546 relates to a method and apparatus for bladderless tyre moulding. A bladderless tyre moulding press comprises two platens, namely an upper and a lower platen, and means for moving the platens relative to each other from an open position to a closed moulding position, platen mounting means for moulding the sidewalls of the tyre, and means for moulding the tread band. Each of the platen mounting means serves to mould a corresponding bead of the tyre, and the bead moulding means include central means which are movable with respect to the corresponding platens for insertion into the tyre. Each platen includes bead moulding means which, when extended, form a surface for moulding an inner surface of the beads. The platens retain the beads and seal them against the sidewall plate of the mould, thus enabling a pressurized fluid to be introduced into the tyre.

SUMMARY OF THE INVENTION

The applicant has observed that deformations of the green tyre, such as its ovalization, may occur during the moulding and curing process, leading to the presence of defects in the finished (cured) tyre, such as the slipping of one or more carcass plies, or the presence of undesired excess and/or insufficient volumes of material. In particular, the design requirements for the production of high-performance tyres for top-range cars are such that these deformations may entail the rejection of the tyre.

The applicant has also verified that these geometrical deformations, and consequently the development of imperfections in the finished tyre, occur predominantly at the positions of the beads, each of the beads also being denoted below by the more general term "annular fixing structure".

As shown in the documents cited above, the applicant has verified that the green tyre is placed in the curing machine where it is inserted into a curing mould comprising a rigid support, an upper sidewall plate and a lower sidewall place which are movable with respect to each other and which, when in the closed position, enclose the green tyre in a mould cavity. Each sidewall plate comprises a bearing (or support) surface for a corresponding axially outer surface of the annular fixing structure of the green tyre. In moulding and curing apparatus that contains an inflatable bladder, the latter is expanded and pressed against the inner surface of the tyre while heat is supplied.

However, the applicant has verified that sufficiently accurate shaping cannot be achieved in annular fixing structures produced by moulding with the aforementioned inflatable bladder delimited by a membrane which compresses an axially inner surface portion of the annular fixing structures against a corresponding surface of the sidewall plates during the moulding and curing step.

The applicant has verified that the tolerances required for top-range tyres cannot be achieved by adding extendable moulding rings for the area of the annular fixing structures to a curing mould, as described in the cited application US 2003/0141627, such that these rings also come into contact with a surface portion of the annular fixing structure during the moulding and curing step with the bladder expanded.

The applicant has also verified that processes such as those described in EP 0368546 do not yield satisfactory results when applied to tyres built from elementary intermediate products, particularly when the latter are moulded and cured while not associated with their forming supports. In this case, these tyres require the presence of a bladder inside a curing mould to achieve correct moulding and curing, since the bladder permits the substantially uniform transmission of the pressure and heat required for the tyre. The absence of a bladder, leading to the direct contact between the pressurized fluid and the radially inner surface of the green tyre, can give rise to a number of problems, such the permeation of the fluid into the tyre structure or deviations from the desired configurations of the various elementary components from which the tyre is formed. Because of the expansion which the pressurized fluid causes in the tyre, these deviations of the elementary components are particularly common at the positions of the annular fixing structures. These problems can then lead on to defects in the finished tyre and the rejection of the tyre.

The applicant has also verified that the compression of the annular fixing structures which takes place between the platen included in the moulding means and the sidewall plate of the mould in the apparatus described in EP 0368546 causes a swelling in the area of the annular fixing structures lying axially inside the tyre and radially outside the circumferential edge of the compression platen, since the deformation caused by the compression by the pressurized fluid causes a displacement of material immediately outside the area delimited by the surfaces in contact with the annular fixing structures, thus creating geometrical irregularities and excess volumes of material which should be avoided or at least minimized.

The applicant has therefore realized that it is necessary to develop a process for moulding and curing tyres in a mould including an inflatable bladder in which appropriate pre-moulding of at least one portion of the area of the annular fixing structure of the green tyre is carried out, in order to avoid the aforementioned deformations.

In particular, the applicant has found that, by securing at least one of the annular fixing structures inside the curing mould, at least in a portion of its axially outer surface, by using a sidewall plate of the mould, and also in a portion of its axially inner surface, by using a surface portion of a bead moulding ring, a precise geometry of the annular fixing structure can be obtained by pre-moulding carried out by inflating an inflatable bladder which is brought, in the expanded state, to a first pressure which is less than the moulding and curing pressure. In particular, during the expansion, the inflatable bladder, delimited by a membrane, acts as a further bearing surface in the pre-moulding of the annular fixing structure.

More specifically, in a first aspect, the invention relates to a tyre moulding and curing process comprising the steps of: introducing a green tyre into a curing mould, said mould including a first sidewall plate and a second sidewall plate, a ring of circumferential sectors circumscribing a mould cavity, an expandable bladder delimited by a membrane, and at least one bead moulding ring which is movable between a first contracted operating position and a second extended operating position; and moulding and curing said green tyre in said curing mould, in which the following steps take place between said step of introducing said green tyre and said step of moulding and curing it:

extending said at least one bead moulding ring from said first contracted operating position to said second extended operating position, forming a circumferential bearing surface which bears against a first axially inner surface portion of a first annular fixing structure of said green tyre;

pressing a second axially inner surface portion of said first annular fixing structure by expanding said membrane at a pre-moulding pressure which is less than a moulding pressure, such that said first annular fixing structure is brought into contact with said first sidewall plate, thus shaping an axially outer surface portion of said first annular fixing structures by means of said first sidewall plate and shaping said first axially inner surface portion of said first annular fixing structure by means of said circumferential surface of said at least one bead moulding ring. In the process according to the invention, therefore, before the pre-moulding step, the first annular fixing structure is retained between the extendable bead moulding ring, which is extended so as to provide a circumferential surface which is brought into contact with an axially inner surface portion of the annular fixing structure, and a bearing surface formed in a sidewall plate which comes into contact with an axially outer portion of the annular fixing structure. When the membrane is inflated, another of the parts on which it exerts pressure is a further axially inner surface portion of the first annular fixing structure which is contiguous to and radially outside the surface which is in contact with the bead moulding ring. The deformation caused by this pressure on the first annular fixing structure is contained by the various bearing surfaces which delimit it, namely the aforementioned circumferential surface of the ring in the case of the axially inner portion, and the bearing surface of the sidewall plate in the case of the axially outer portion, and the resulting geometry of the annular fixing structure is thus defined with high precision. The presence of the membrane prevents the creation of swelling due to the "squeezing" of the annular fixing structure between these two substantially opposed surfaces, since it also acts as a bearing surface confining the deformation affecting the annular fixing structure.

The applicant has verified that the application of this solution makes the geometry of the first annular fixing structure particularly regular. Preferably, the shape imparted to the first annular fixing structure at the end of the pre-moulding step is substantially identical to its finished shape, in other words identical to the shape of the finished tyre.

Following this first pre-moulding step, in the process according to the invention, the actual moulding and curing steps are carried out by varying the pressure to which the bladder is raised.

In a second aspect, the invention relates to an apparatus for moulding and curing green tyres, comprising:

a curing mould, said mould including a first sidewall plate and a second sidewall plate, with a ring of circumferential sectors circumscribing a mould cavity, said first sidewall plate being capable of coming into contact with an axially outer surface portion of a first annular fixing structure when said green tyre is inserted into said mould;

at least a first bead moulding ring which is movable from a first contracted operating position to a second extended operating position in which it forms a circumferential surface, and which can come into contact, in this second extended operating position, with a first axially inner surface portion of a first annular fixing structure of said green tyre;

an expandable bladder delimited by a membrane associated for operation with said mould in such a way as to exert a pre-moulding pressure which is lower than a moulding pressure, so as to bring said first annular fixing structure into contact with said first sidewall plate, thus shaping said axially outer surface portion of said first annular fixing structure by means of said first sidewall plate and shaping said first axially inner surface portion by means of said circumferential surface of said at least one first bead moulding ring.

Advantageously, therefore, the apparatus according to the invention is similar to conventional apparatus used for moulding and curing tyres, with relatively few modifications. In particular, the retention of at least one of the annular fixing structures is modified by the inclusion of a bead moulding ring, the mechanism for extending and contracting this ring, and the concomitant action of said expandable bladder.

In at least one of the aforesaid aspects, the present invention can have at least one of the following preferred characteristics.

Preferably, the second axially inner surface portion of said first annular fixing structure is contiguous and radially external to said first axially inner surface portion of the first annular fixing structure bearing against the circumferential surface of the at least one bead moulding ring.

In a preferred embodiment, said moulding and curing step comprises the step of increasing said pre-moulding pressure to said moulding pressure.

Preferably, said pre-moulding pressure is in the range from approximately 0.1 to approximately 2 bars.

Even more preferably, said pre-moulding pressure is in the range from approximately 0.2 to approximately 0.8 bar.

In an alternative example, said at least one bead moulding ring comprises a plurality of alternating sectors, said step of extending said at least one bead moulding ring comprising the steps of:

axially translating said sectors of said at least one bead moulding ring towards said first sidewall plate;
radially extending said at least one bead moulding ring from said contracted operating position with the sectors retracted, having a first diameter smaller than the circumference of said first annular fixing structure, to said second extended operating position of said at least one bead moulding ring with the sectors extended, forming said circumferential surface having a second diameter which is greater than the diameter of said first annular fixing structure, so as to retain said first annular fixing structure between said circumferential surface and said first sidewall plate.

The bead moulding ring thus moves by axial translation and radial extension so as to retain the first annular fixing structure against the corresponding sidewall plate on which it bears.

In particular, in a preferred embodiment, said curing mould includes a first and a second bead moulding ring, the following steps being included between the step of extending said at least one bead moulding ring and the step of pressing a second axially inner surface portion of said first annular fixing structure:

extending said second bead moulding ring, forming a second circumferential bearing surface which bears against a first axially inner surface portion of said second annular fixing structure;

making said second sidewall plate bear against said second annular fixing structure.

More preferably, said step of pressing a second axially inner surface portion of said first annular fixing structure includes the steps of:

pressing a second axially inner surface portion of said second annular fixing structure by expanding said membrane at said pre-moulding pressure in such a way that said second annular fixing structure is brought into contact with said second sidewall plate, thus shaping an axially outer surface portion of said second annular fixing structure by means of said second sidewall plate and shaping said first axially inner surface portion of said second annular fixing structure by means of said second bead moulding ring.

Preferably, therefore, the pre-moulding operation is carried out for both of the annular fixing structures of the tyre, thus shaping both beads with precision according to the design.

In a preferred embodiment, said second bead moulding ring comprises a plurality of petal-like elements, said step of extending said second bead moulding ring including the step of rotating said petal-like elements with respect to each other.

Preferably, said mould includes a telescopic central body into which said tyre is inserted and on which said expandable bladder is fixed, said opposing ends of said telescopic central body being fixed to said first and said second moulding rings, and the steps of extending said first moulding ring and said second moulding ring are preceded by the step of:
telescopically elongating or shortening said telescopic central body according to the axial dimension of said green tyre so as to place said second moulding ring in the contracted position at the position of said second annular fixing structure of said green tyre.

The apparatus according to the invention preferably comprises a telescopic central element on which said green tyre is fitted and to which said membrane delimiting said expandable bladder is fixed.

In a preferred embodiment, the apparatus includes a second bead moulding ring which is movable from a first contracted operating position to a second extended operating position in which it forms a second circumferential surface, and which can come into contact, in this second extended operating position, with a first radially inner surface portion of said second annular fixing structure.

In a different aspect, said telescopic central element includes at its first end a platen, to which said first bead moulding ring is fixed, and at its second, opposing, end a second platen to which said second bead moulding ring is fixed.

Preferably, said first bead moulding ring includes a plurality of sectors divided into a first plurality and a second plurality, each sector of the first plurality alternating circumferentially with a sector of the second plurality.

More preferably, said sectors of the first plurality are radially divergent, and said sectors of the second plurality are radially convergent.

In a more preferable embodiment, a radially outer edge of said first plurality and a radially inner edge of said second plurality are offset in said first contracted operating position of said first bead moulding ring.

In another aspect, said edge of said first plurality is substantially coaxial with the edge of said second plurality in said second extended operating position of said ring so as to form said continuous circumferential surface.

Preferably, said first bead moulding ring comprises a cone-shaped element which is inserted into the centre of said first bead moulding ring and is axially movable so as to move said first bead moulding ring from said contracted operating position to said extended operating position.

In another preferred embodiment, said second bead moulding ring comprises a plurality of petal-like elements having substantially identical shapes, said petal-like elements being movable from said first contracted operating position in which they are partially superimposed to said second operating position in which they are contiguous.

Even more preferably, said second bead moulding ring comprises a cam for moving said petal-like elements from said first contracted operating position to said second extended operating position.

Other features and advantages of the invention will be made clear by the detailed description of a preferred, but not exclusive, embodiment of a process for moulding and curing tyres and of an apparatus for the execution of the aforesaid process according to the present invention.

BRIEF DESCRIPTION OF THE DRAWINGS

This description is given below with reference to the appended drawings, which are provided for guidance only and which are therefore non-limiting, in which.

DETAILED DESCRIPTION OF THE INVENTION

Figure 1:
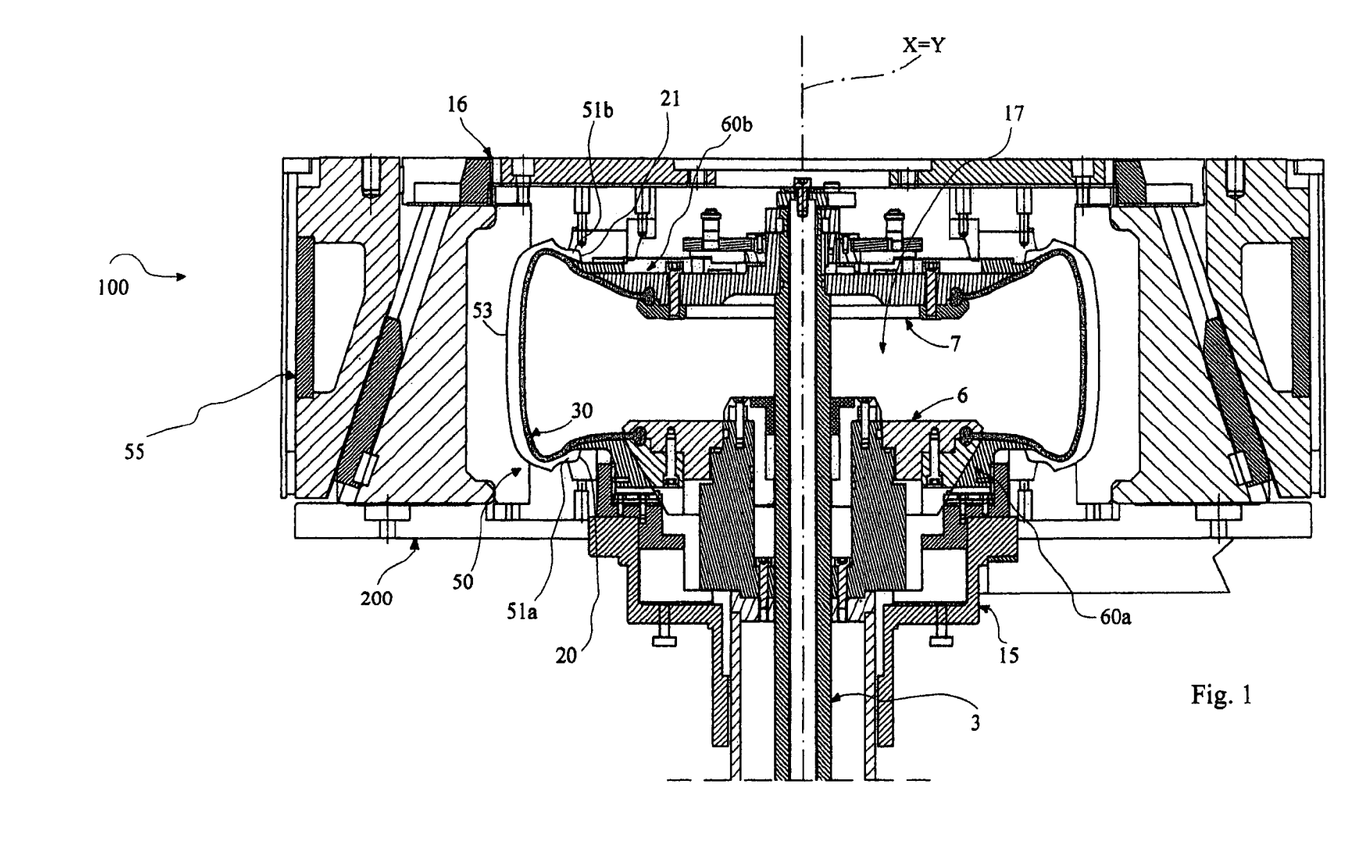
FIG. 1 is a sectional schematic side view of an apparatus for moulding and curing tyres according to the present invention in a first operating position.
Figure 2:
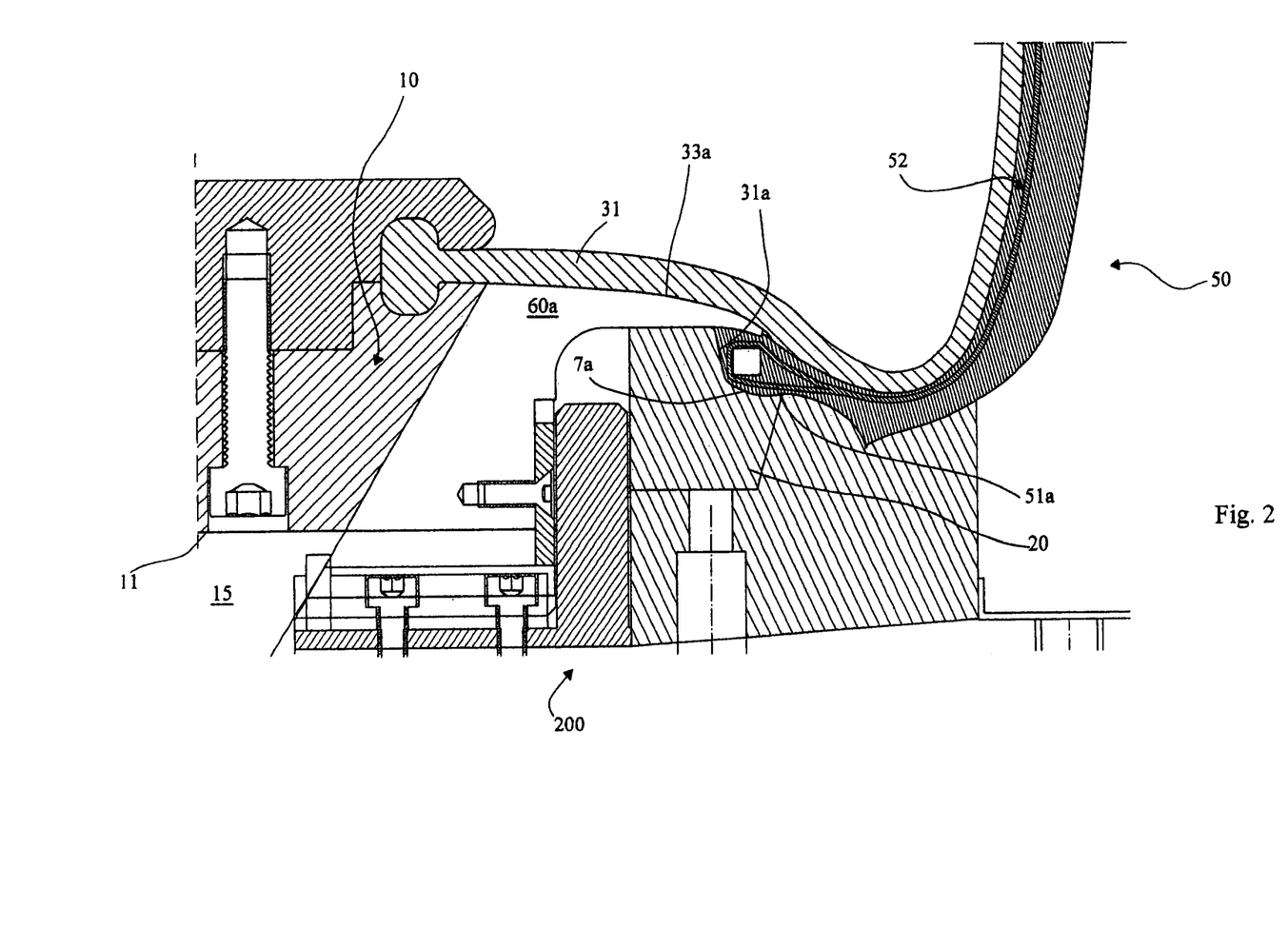
FIGS. 2 and 3 show enlargements of two details of the apparatus of FIG. 1.
Figure 3:
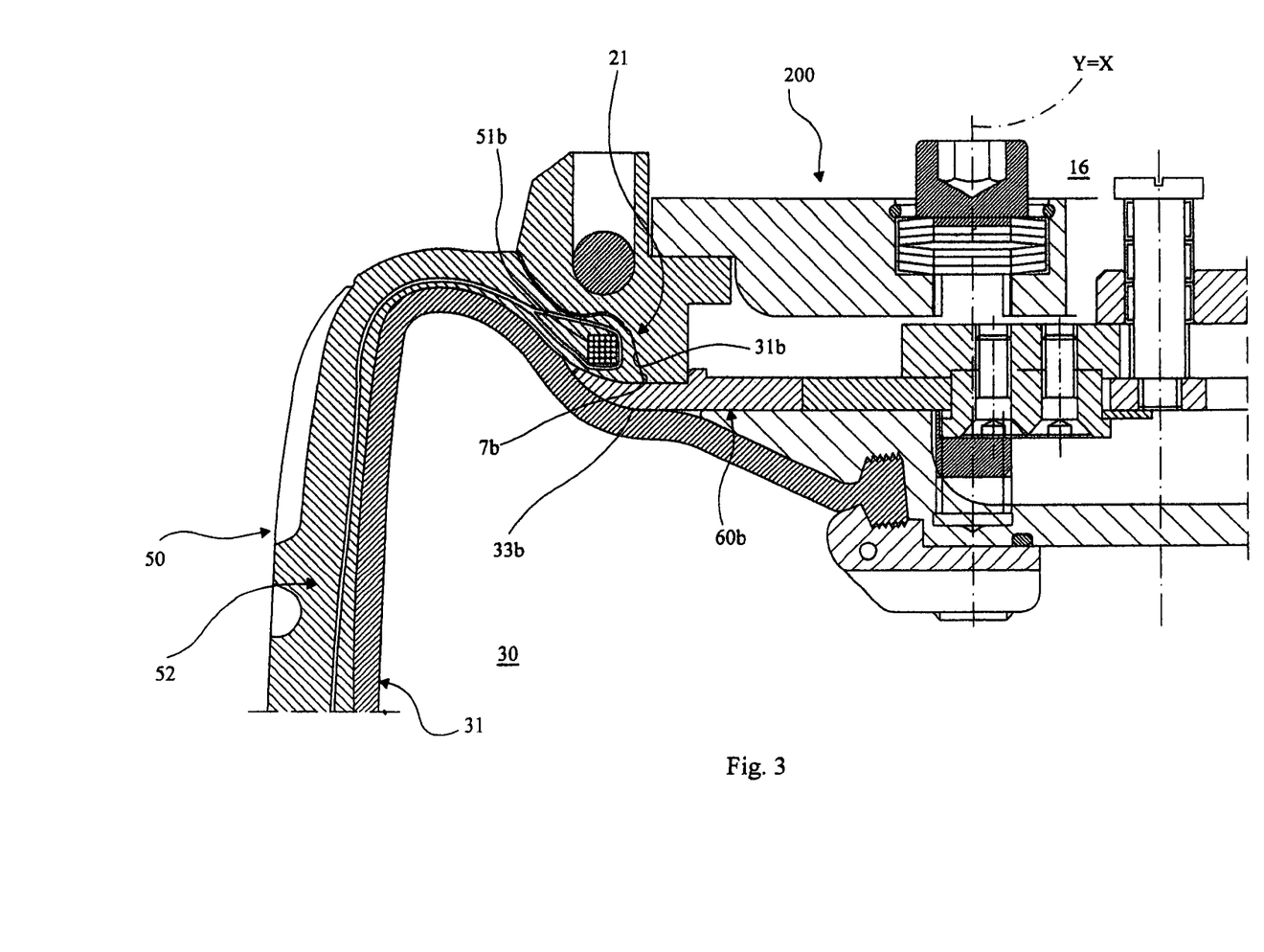

With reference to FIGS. 1 to 3 initially, the number 100 indicates an apparatus for moulding and curing tyres for vehicle wheels according to the present invention.

The apparatus 100 can receive green tyres 50 assembled in a preceding processing step, or in a suitable forming step; for example, the green tyres 50 can be formed from elementary components deposited on a suitable forming support.

In detail, the green tyre 50, shown only in section and schematically in the appended FIG. 1, defines an axis X substantially coinciding with its own axis of rotation and comprises a carcass structure 52 including at least one carcass ply (not shown in the drawings) which is associated for operation with a pair of annular fixing structures 51a and 51b, a tread band 53 in a position radially external to said carcass structure, and a belt structure (not shown) interposed between the carcass structure and the tread band 53. Planes containing the axis of rotation of the tyre are indicated as radial planes.

In the following text, the tyre will be described with reference to its axis X and to radial planes, and therefore the references to "axially inner/outer" or "radially inner/outer" are to be understood with reference to the aforesaid axis and planes.

As shown schematically in FIG. 1, the annular fixing structures 51a and 51b represent the two opposing radially inner ends of the green tyre 50.

The apparatus 100 comprises a curing mould 200 which has a lower sidewall plate 20 and an upper sidewall plate 21 (otherwise referred to, respectively, as the first sidewall plate and the second sidewall plate, not necessarily in this order) which are, respectively, engaged with a base 15 and with a closing portion 16 of a container 17, and a substantially cylindrical telescopic central body 3, with an axis Y, into which the green tyre 50 is inserted. The central body 3 is moved in its axial telescopic elongations and contractions, for example by means of hydraulic cylinders (not shown).

The mould 200 also includes a ring of circumferential sectors 55 which define a mould cavity in which is defined a geometric axis which coincides with the axis Y of the central body 3 and which preferably also coincides, as shown in FIG. 1, with the axis of rotation X of the green tyre 50 when the latter is inserted into the apparatus 100.

The circumferential sectors 55 generally carry forming projections (not shown in FIG. 1) and are designed to act on a radially outer surface of what is known as the tread band of the green tyre 50, to create in this tread band a series of indentations and channels positioned suitably in a desired "tread pattern".

To enable a single reference system to be used, the "axial" directions in the following text are directions parallel to the central body 3 and parallel to the axis of rotation X of the tyre inserted into the apparatus 100. Similarly, a "radial" direction is the direction of a radius originating on the axis of rotation (perpendicular to it) of the tyre, which coincides with the axis of rotation of the apparatus. In a similar way, "internal" and "external", and terms related thereto, refer to the inner cavity of the apparatus (described more fully below) and/or of the tyre.

The base 15 and the closing portion 16, together with the corresponding lower sidewall plate 20 and upper sidewall plate 21, are movable with respect to each other between an open condition in which they are remote from each other to permit the introduction of the green tyre 50 to be cured into the mould 200, and a closed position in which they are placed next to each other to enclose the green tyre 50 in the mould cavity (in other words, the container 17).

In detail, the sidewall plates 20 and 21 face each other and are designed to act, respectively, on the opposing annular fixing structures 51a and 51b of the green tyre 50, in order to shape its axially outer surfaces.

Preferably, with reference to the details shown in FIGS. 2 and 3, each of the sidewall plates 20, 21 has a perimetric supporting surface 31a, 31b, on a portion of which a respective portion of the first and/or second axially outer surface 7a, 7b of the annular fixing structures 51a, 51b bears.

Additionally, an expandable bladder 30 of toroidal shape, delimited by a membrane 31, is fixed to the telescopic central body 3, preferably at its two opposing ends. The bladder 30 can be expanded in a known way during the moulding and curing process, so as to bring the membrane 31 into contact with the inner surface of the green tyre 50, thus pressing this surface outwards while heat is supplied, and in this way exerting a moulding pressure and transmitting at least some of the heat required for curing.

The bladder 30 is inflated by means of a feed device which introduces a fluid, such as steam, air or inert gases, through a suitable passage which is not shown in the drawings, until the desired moulding pressure is reached.

As described more fully below, the expandable bladder 30 can also exert a pre-moulding pressure, which is lower than the moulding pressure, in order to bring the first and second annular fixing structures into contact with the upper and lower sidewall plates, so as to shape the axially outer surface portion 7a, 7b of each annular fixing structure 51a, 51b by means of the respective sidewall plate 20, 21.

The apparatus 100 also comprises a first platen 6 and a second platen 7 fixed to the two opposite ends of the central telescopic element 3. The apparatus 100 also includes at least a first bead moulding ring 60a, and more preferably two bead moulding rings, namely an upper and a lower ring 60a, 60b, which are movable from a first contracted operating position to a second extended operating position in which they form a circumferential surface 33a, 33b. In this second extended operating position, with the tyre 50 inserted in the mould 200, each ring 60a, 60b can come into contact with a first axially inner surface portion of the first and the second annular fixing structure 51a, 51b respectively of the green tyre 50. In the contracted position, the bead moulding rings 60a, 60b have a diameter smaller than the diameter of the green tyre 50 at the positions of the annular fixing structures 51a, 51b, thus enabling the tyre to be inserted into or removed from the central body 3.

Preferably, the lower and upper bead moulding rings 60a, 60b are fixed at the positions of the platens of the central body 3, and are concentric with this body (in other words, the axis Y passes through the centre of each ring).

The configuration of the apparatus 100 at the position of the lower annular fixing structure 51a is described more fully below, and this description, where no express indication to the contrary is given in the text, is preferably also understood to refer to the configuration of the apparatus 100 at the position of the upper annular fixing structure 51b.

When the green tyre 50 is inserted into the mould 200 and the lower bead moulding ring 60a is in an extended position, the lower annular fixing structure 51a of the tyre bears on a portion of the perimetric supporting surface 31a belonging to the lower sidewall plate 20 of the mould, and on a circumferential surface portion defined on the lower bead moulding ring 60a which also acts as a bearing surface.

When the bladder 30 is expanded up to a pre-moulding pressure, the membrane 31 comes into contact with a second axially inner surface portion of the lower annular fixing structure 51a which is located in a radially outer position with respect to the area of contact between the annular fixing structure 51a and the lower bead moulding ring 60a (in other words, the first axially inner surface portion), and which is contiguous to this area. The pressure exerted by the membrane 31 on the inner surface of the green tyre 50, in the way which is described more fully below, enables the annular fixing structure 51a to be moulded precisely by acting as a further bearing surface for the annular structure.

FIGS. 2 and 3 show two enlarged details with the tyre 50 inserted and the bladder 30 expanded, and with the bead moulding rings 60a, 60b both in the extended operating position of the apparatus 100 at the positions of the lower sidewall plate 20 and the upper sidewall plate 21 respectively. As shown in FIG. 2, the lower annular fixing structure 51a is retained and delimited by a plurality of surfaces, in portions of both its axially inner and its axially outer surfaces; in other words, its first and second axially inner surface portions are delimited by a portion of the circumferential surface 33a of the lower bead moulding ring 60a and by a portion of the membrane 31, while its axially outer surface portion is delimited by the perimetric surface 31a of the lower sidewall plate 20.

The lower bead moulding ring 60a is shown schematically in detail in FIGS. 4a, 4b and 5a, 5b. The ring includes a series of sectors divided into a first and a second plurality 8, 9, each sector of the first plurality 8 alternating circumferentially with a sector of the second plurality 9. The sectors of the first plurality 8 are radially divergent; in other words, as they depart from the axis Y of the mould 200 they have the shape of a segment whose edge 34 defines a radially outer circular sector which has a greater extension than a radially inner edge opposite thereto. The sectors of the second plurality 9 are radially convergent; in other words each of them is also shaped in the form of a segment, but an edge 34' defines a radially inner sector of a circle which has the greater extension of each segment as compared with a radially outer edge opposite thereto.

The ring 60a also includes an element 10 in the shape of a cone or a truncated cone positioned parallel to the axis Y of the mould 200, and having its vertex 11 inserted into the centre of the bead moulding ring 60a.

Additionally, the sectors 8, 9 can slide from a contracted position to an extended position. In the first position, the edge 34 defining the radially outer circular sector of said first plurality 8 and the edge 34' defining the radially inner circular sector of said second plurality 9 are offset in said first contracted operating position of said first bead moulding ring 60a; in other words, the second plurality of convergent sectors 9 is more re-entrant (has a smaller distance between the circular sector 34' and the axis Y) than the first plurality 8 of divergent sectors.

Figure 4A:
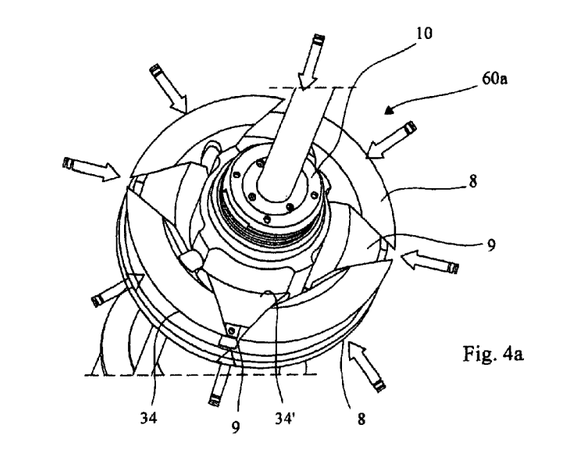
FIGS. 4a and 4b show, respectively, a perspective view and a partial view in lateral section of a lower bead moulding ring in a first operating position.
Figure 4B:
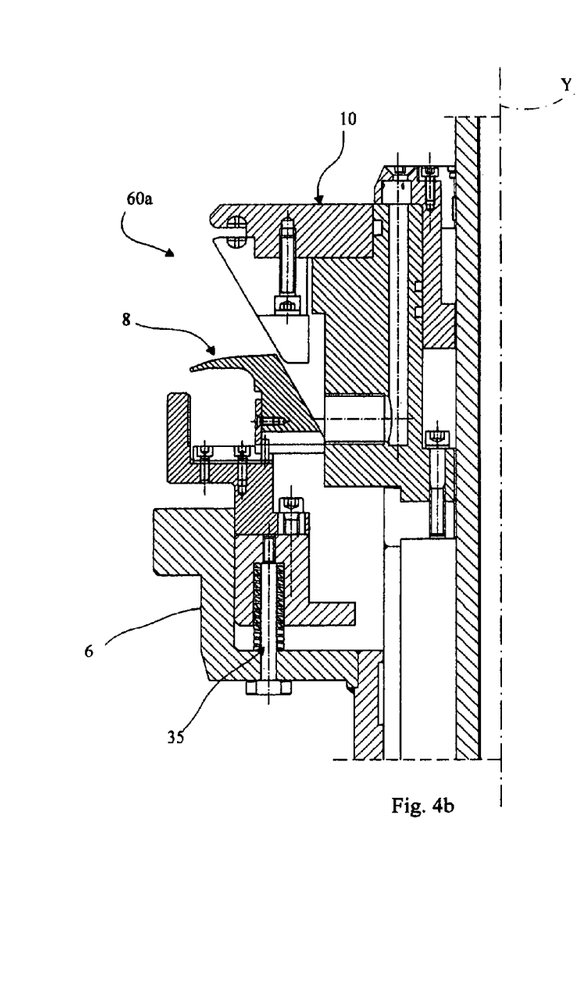
Figure 5A:
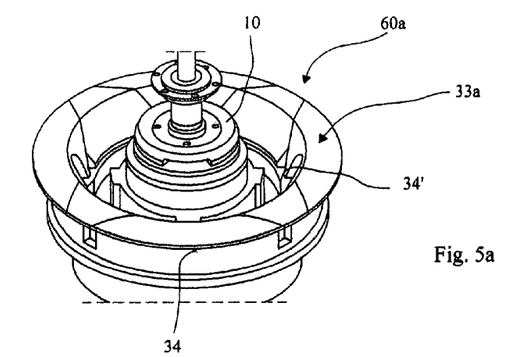
FIGS. 5a and 5b show, respectively, a perspective view and a partial view in lateral section of the lower bead moulding ring in a second operating position.
Figure 5B:
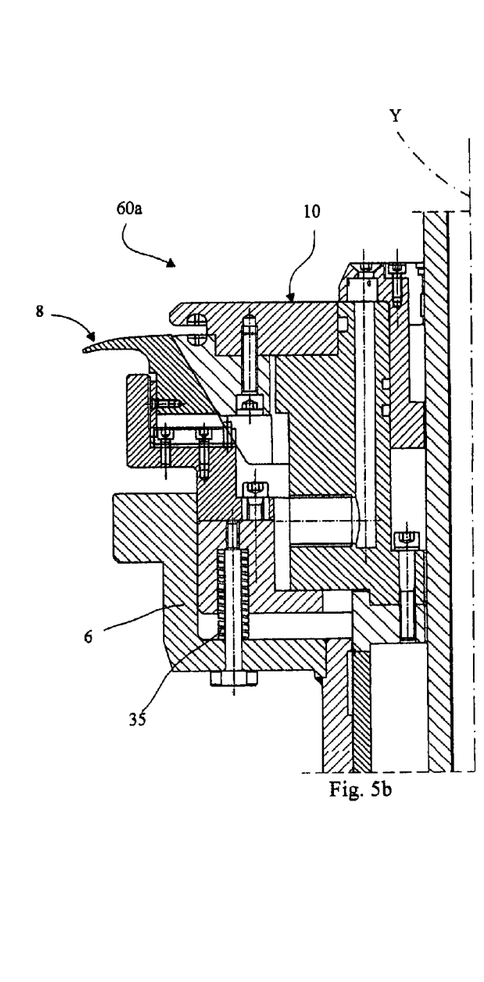

The contracted position is reached when the cone-shaped element 10 is only partially inserted into the centre of the ring 60a and creates no compression towards the platen 6 (see FIGS. 4b and 5b). When the cone-shaped element 10 moves towards the platen 6, this movement being provided by hydraulic cylinders for example, the first and second plurality of sectors 8, 9 are extended, by their downward translation and simultaneous radial movement. The second plurality of convergent sectors 9 is aligned with the first plurality of divergent sectors 8; in other words, the edge 34 of said first plurality of divergent sectors 8 is circumferentially aligned with a radially outer edge of said second plurality of convergent sectors 9 in said second extended operating position of the ring, thus forming a continuous circumferential surface 33a (see FIG. 5a).

Opposing springs 35 (visible in FIGS. 4b and 5b) ensure that the sectors 8, 9 contract when the cone-shaped element 10 is translated away from the platen 6, and that the diameter of the ring 60a is reduced.

Figure 6:
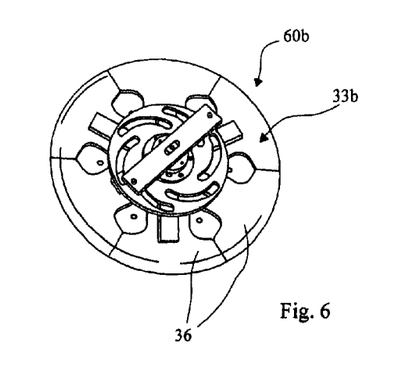
FIG. 6 shows a perspective view of an upper bead moulding ring in a first operating position.
Figure 7:
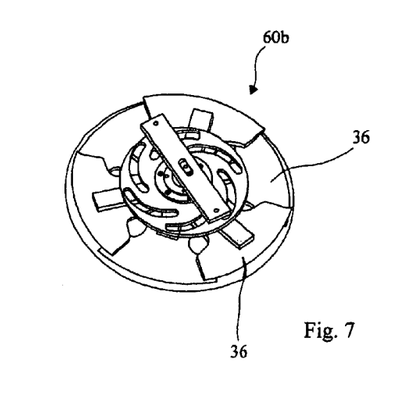
FIG. 7 shows a perspective view of the upper bead moulding ring in a second operating position.

With reference to FIGS. 6 and 7, the second bead moulding ring 60b comprises a plurality of petal-like elements 36 having substantially identical shapes to each other, said petal-like elements 36 being movable from a first contracted operating position in which they are partially superimposed to a second operating position in which they are contiguous. The movement from one operating position to the other takes place, for example, by a relative rotation of the petals 36 by means of a driving cam on a splined shaft (not shown in the drawings).

Figure 8:
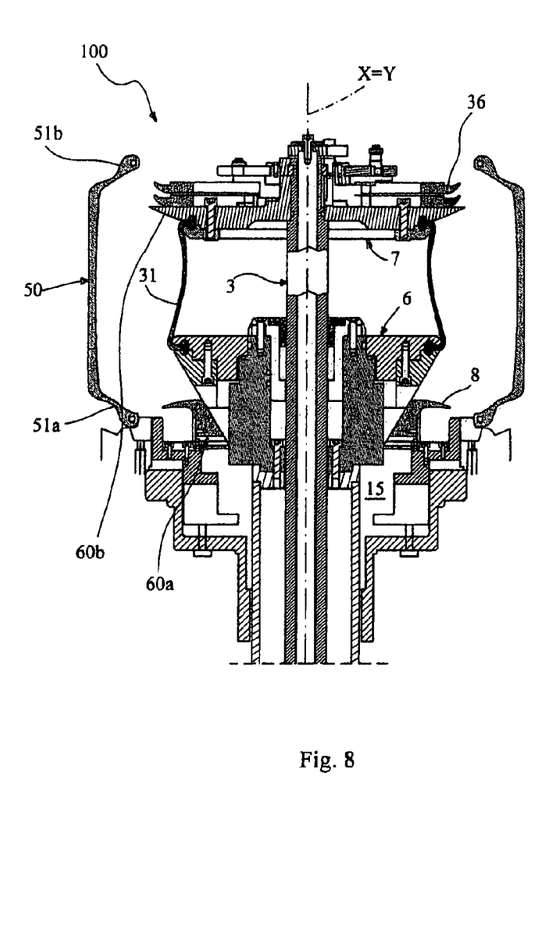
FIGS. 8 to 13 show a plurality of steps of the moulding and curing process according to the invention, in which the moulding and curing apparatus is shown schematically and partially.

According to the method of the invention, in a configuration with the closing element 16 placed in the open position, with the inflatable bladder 30 in the deflated operating position, and with both of the bead moulding rings 60a, 60b contracted, the green tyre 50 is positioned, for example by means of a robotic arm using grippers, on the base 15 of the mould 200 in such a way that it is fitted into the central body 3 and the axis of rotation X of the green tyre 50 and the axis Y of the apparatus 100 coincide. In this configuration which is shown in FIG. 8, the lower annular fixing structure 51a of the green tyre bears against the lower sidewall plate 20. The bead moulding ring 60a is housed inside the green tyre 50.

As mentioned above, the central body 3 is preferably telescopic, so that its height can be adjusted to match green tyres 50 of various sizes. It is then translated in such a way that the second platen 7 carrying the second bead moulding ring 60b is brought to the position of the upper annular fixing structure 51b. The travel of the telescopic body 3 is predetermined according to the axial dimension of the tyre 50.

Figure 9:
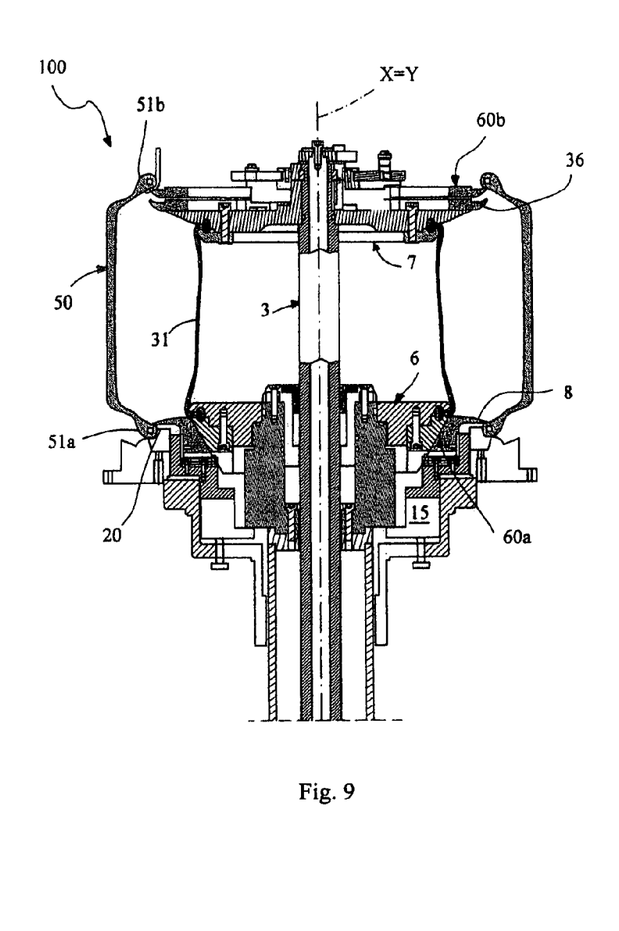

The lower and upper bead moulding rings 60a, 60b are then brought into the second extended operating position, in which they form a circumferential surface 33a, 33b and come into contact with the first axially inner portion of the annular fixing structures 51a, 51b respectively. The configuration reached in this step can be seen in FIG. 9. It should be noted that the upper sidewall plate 21 is not yet in contact with the upper annular fixing structure 51b.

The annular fixing structures 51a, 51b are thus retained.

Figure 10:
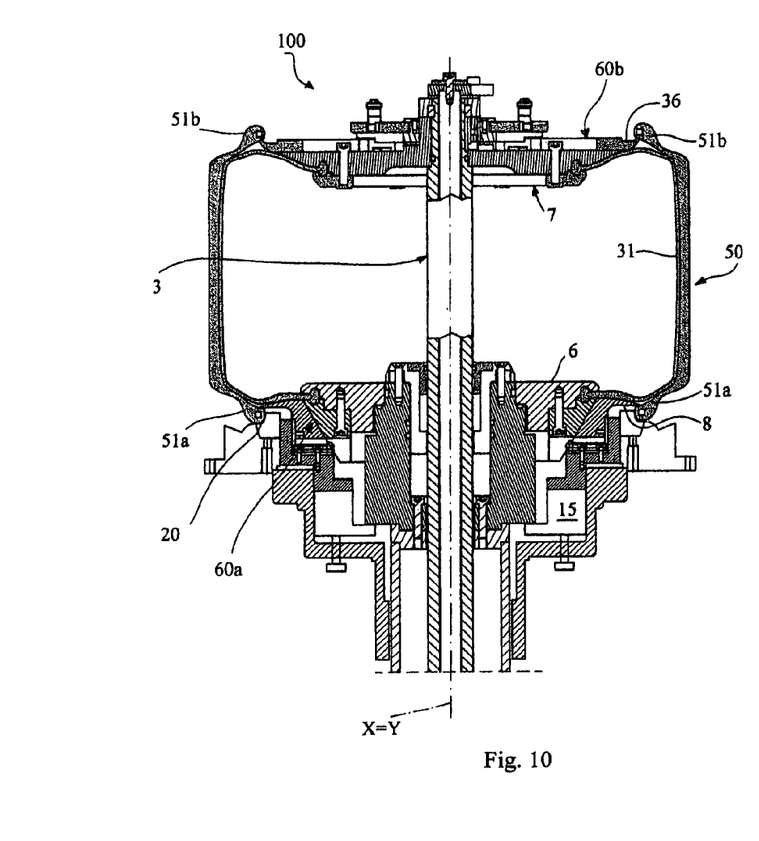

The bladder 30 is then inflated (this step being shown in FIG. 10) by introducing steam, hot air or other heated fluid or gas through a passage which is not shown in the drawings, to a first pressure which is lower than the final pre-moulding pressure, to keep the green tyre 50 substantially retained around the central body 3 and prevent undesired movements of the tyre. This first pressure can preferably be in the range from approximately 0.1 bar to approximately 0.3 bar.

It should be emphasized that, in this description and in the subsequent claims, each value of pressure is to be understood as a relative value of pressure with respect to atmospheric pressure.

Figure 11:
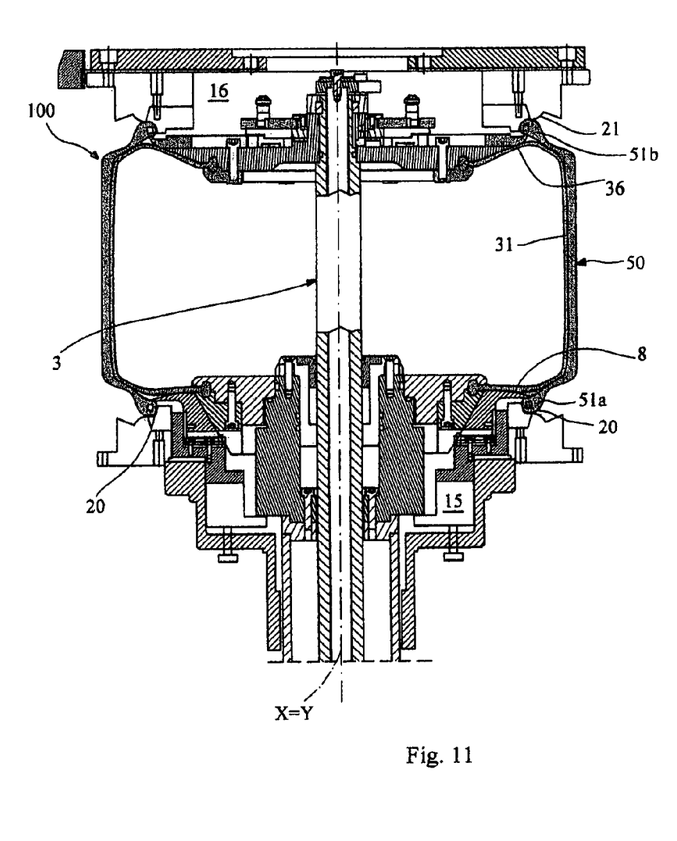

The apparatus of the invention 100 is then closed, using the closing element 16, so that the upper annular fixing structure 51b of the green tyre 50 bears against the upper sidewall plate 21 (see FIG. 11). The bladder 30 is then inflated until the desired pre-moulding pressure is reached. Preferably, said pre-moulding pressure is in the range from approximately 0.1 bar to approximately 2 bars. Even more preferably, said pre-moulding pressure is in the range from approximately 0.2 bar to approximately 0.8 bar.

In this configuration, a portion of the membrane 31 of the bladder 30 comes into contact with the second axially inner surface portion of the lower and upper annular fixing structures 51a, 51b, thus pushing them outwards. Because of the combined action of the bead moulding rings, the sidewall plates and the membrane, the annular fixing structures are shaped to the desired geometry.

In particular, the pressure exerted on each annular fixing structure 51a, 51b produces a modification of the shape with respect to the initial shape, in other words the shape of the green tyre 50 at the time of its insertion.

The expandable bladder 30 is kept at this pre-moulding pressure for a period preferably in the range from approximately 30 seconds to approximately 2 minutes.

The fluid present in the expandable bladder 30 while the pre-moulding pressure is exerted has a temperature preferably in the range from approximately 110° C. to approximately 120° C.

At the end of the period required for the pre-moulding operation, the expandable bladder 30 is raised to a higher pressure, in other words the moulding pressure, generally in the range from approximately 16 bars to approximately 28 bars, for the purpose of moulding and curing the green tyre 50.

Figure 12:
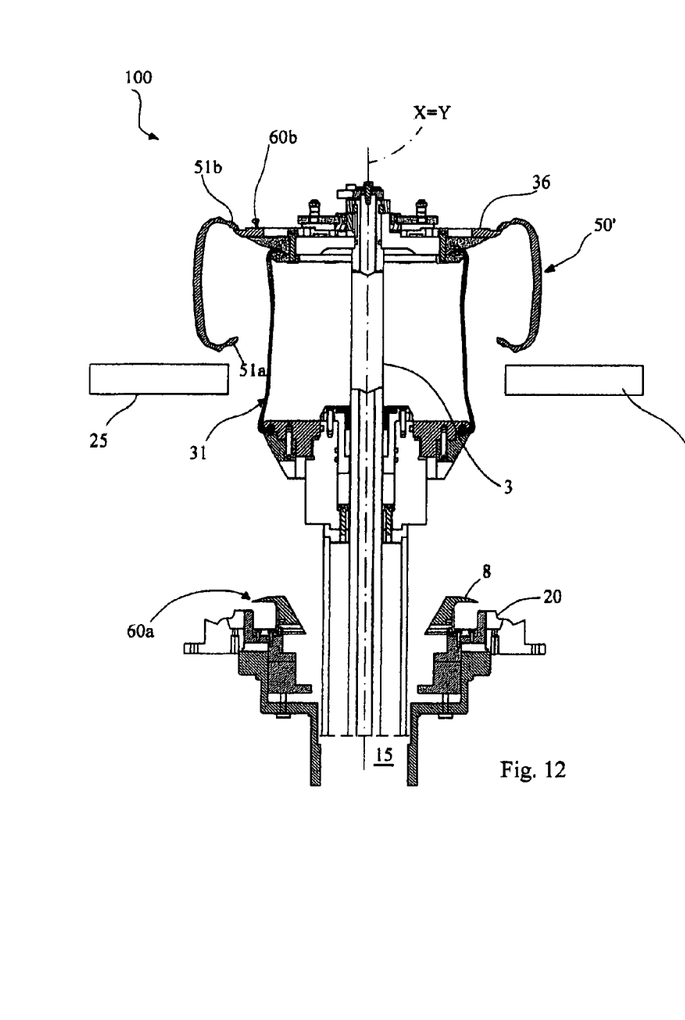
Figure 13:
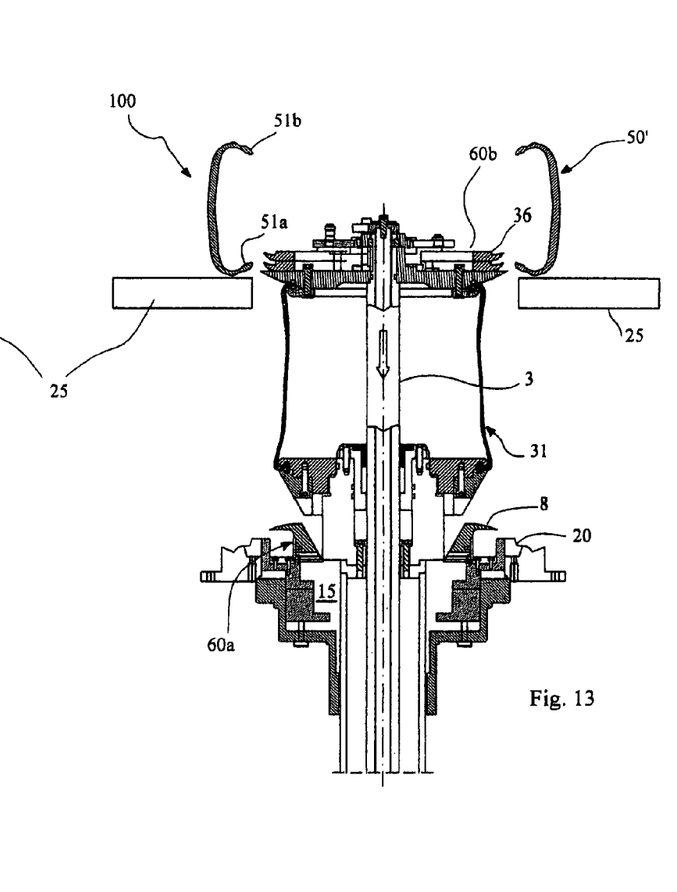

At the end of the moulding and curing step, the bladder 30 is deflated and the apparatus 100 is opened. The lower moulding ring 60a is brought to the contracted operating position, thus releasing the lower annular fixing structure 51a, and the central body 3 is translated, thus raising the tyre (FIG. 12). Subsequently, when the upper moulding ring 60b is contracted, the finished tyre 50' is removed and placed, for example, on a discharge roller conveyor 25.

A new green tyre 50 is fitted in the apparatus 100, and the cycle described above by way of example is repeated.

The invention claimed is:

1. A process for moulding and curing a tyre, the process comprising:
   introducing a green tyre into a curing mould, said mould comprising a first sidewall plate and a second sidewall plate, a ring of circumferential sectors circumscribing a mould cavity, an expandable bladder delimited by a membrane, and a first and a second bead moulding ring each movable between a first contracted operating position and a second extended operating position, the second bead moulding ring comprising a plurality of petal-like elements; and
   moulding and curing said green tyre in said curing mould, wherein between introducing said green tyre and moulding and curing said green tyre:
      extending the first bead moulding ring from said first contracted operating position to said second extended operating position, forming a first circumferential bearing surface which bears against a first axially inner surface portion of a first annular fixing structure of said green tyre;
      extending the second bead moulding ring to form a second circumferential bearing surface which bears against a first axially inner surface portion of a second annular fixing structure of the green tyre, wherein extending the second bead moulding ring includes rotating the petal-like elements with respect to each other;
      making the second sidewall plate bear against the second annular fixing structure; and
      pressing a second axially inner surface portion of said first annular fixing structure by expanding said membrane at a pre-moulding pressure which is less than a moulding pressure, whereby said first annular fixing structure is brought into contact with said first sidewall plate, thus shaping an axially outer surface portion of said first annular fixing structure using the first sidewall plate and shaping said first axially inner surface portion of said first annular fixing structure using the first circumferential surface of the first bead moulding ring.

2. The process according to claim 1, wherein:
   the first bead moulding ring comprises a plurality of sectors; and
   said second axially inner surface portion of said first annular fixing structure is contiguous and radially external to said first axially inner surface portion of said first annular fixing structure which bears against said sector of the first bead moulding ring.

3. The process according to claim 1, wherein moulding and curing said green tyre comprises increasing said pre-moulding pressure to said moulding pressure.

4. The process according to claim 1, wherein said pre-moulding pressure is in a range from approximately 0.1 to approximately 2 bars.

5. The process according to claim 1, wherein said pre-moulding pressure is in a range from approximately 0.2 to approximately 0.8 bar.

6. The process according to claim 1, wherein the first bead moulding ring comprises a plurality of alternating sectors, and extending the first bead moulding ring comprises:
axially translating said sectors of the first bead moulding ring toward said first sidewall plate; and
radially extending the first bead moulding ring from said contracted operating position with retracted sectors, having a first diameter smaller than a circumference of said first annular fixing structure, to said second extended operating position of the first bead moulding ring with extended sectors, forming said first circumferential surface having a second diameter which is greater than a diameter of said first annular fixing structure, so as to retain said first annular fixing structure between said first circumferential surface and said first sidewall plate.

7. The process according to claim 1, wherein extending the second bead moulding ring and making the second sidewall plate bear against the second annular fixing structure occur between extending the first bead moulding ring and pressing the second axially inner surface portion of said first annular fixing structure.

8. The process according to claim 1, wherein pressing the second axially inner surface portion of said first annular fixing structure comprises:
pressing a second axially inner surface portion of said second annular fixing structure by expanding said membrane at said pre-moulding pressure in such a way that said second annular fixing structure is brought into contact with said second sidewall plate, thereby shaping an axially outer surface portion of said second annular fixing structure by means of said second sidewall plate and shaping said first axially inner surface portion of said second annular fixing structure by means of said second bead moulding ring.

9. The process according to claim 1, wherein:
said mould comprises a telescopic central body into which said green tyre is inserted and on which said expandable bladder is fixed, said opposing ends of said telescopic central body being fixed to said first and said second bead moulding rings, and
extending said first bead moulding ring and said second bead moulding ring is preceded by:
telescopically elongating or shortening said telescopic central body according to the axial dimension of said green tyre so as to place said second bead moulding ring in the contracted position at the position of said second annular fixing structure of said green tyre.

10. The process according to claim 1, wherein the petal-like elements of the second bead moulding ring have substantially identical shapes.

11. The process according to claim 1, wherein extending the second bead moulding ring includes moving the petal-like elements from a first contracted operating position in which the petal-like elements are partially superimposed to a second operating position whereby the petal-like elements are contiguous and form the second circumferential bearing surface.

12. The process according to claim 11, wherein, in the second operating position, the second circumferential bearing surface is continuous.

13. The process according to claim 11, wherein the petal-like elements are in the second operating position during the moulding and curing of the green tyre.

14. The process according to claim 1, wherein the second bead moulding ring is extended during the moulding and curing of the green tyre.

15. The process according to claim 1, further including extending a telescopic central element on which the green tyre is fitted and to which the membrane delimiting the expandable bladder is fixed, an amount of extension of the telescopic central element being based on a size of the green tyre.

16. The process according to claim 15, wherein:
the telescopic central element comprises at a first end thereof, a first platen, to which the first bead moulding ring is fixed, and, at a second opposing end thereof, a second platen, to which the second bead moulding ring is fixed; and
extending the telescopic central element includes adjusting a distance between the first platen and the second platen.

17. The process according to claim 1, wherein:
the first bead moulding ring comprises a plurality of sectors divided into a first plurality and a second plurality, each sector of the first plurality alternating circumferentially with a sector of the second plurality; and
extending the first bead moulding ring from the first contracted operating position to the second extended operating position includes moving the plurality of sectors from a contracted position to an extended position.

18. The process according to claim 17, wherein the sectors of the first plurality are radially divergent, and the sectors of the second plurality are radially convergent.

19. The process according to claim 17, wherein extending the first bead moulding ring from the first contracted operating position to the second extended operating position includes forming a continuous circumferential surface and positioning a radially outer edge of the first plurality substantially coaxial with a radially inner edge of the second plurality.

20. The process according to claim 19, wherein the radially outer edge of the first plurality and the radially inner edge of the second plurality are offset in the first contracted operating position of the first bead moulding ring.

21. The process according to claim 1, wherein extending the first bead moulding ring from the first contracted operating position to the second extended operating position includes axially inserting a cone-shaped element of the first bead moulding ring into a centre of the first bead moulding ring.

* * * * *